March 26, 1968  R. P. KUSKA ET AL  3,374,534
METHOD OF MAKING STATOR WINDINGS OF ELECTRIC MOTORS
IN VIBRATORY-BATTING DEVICES
Filed Oct. 23, 1963
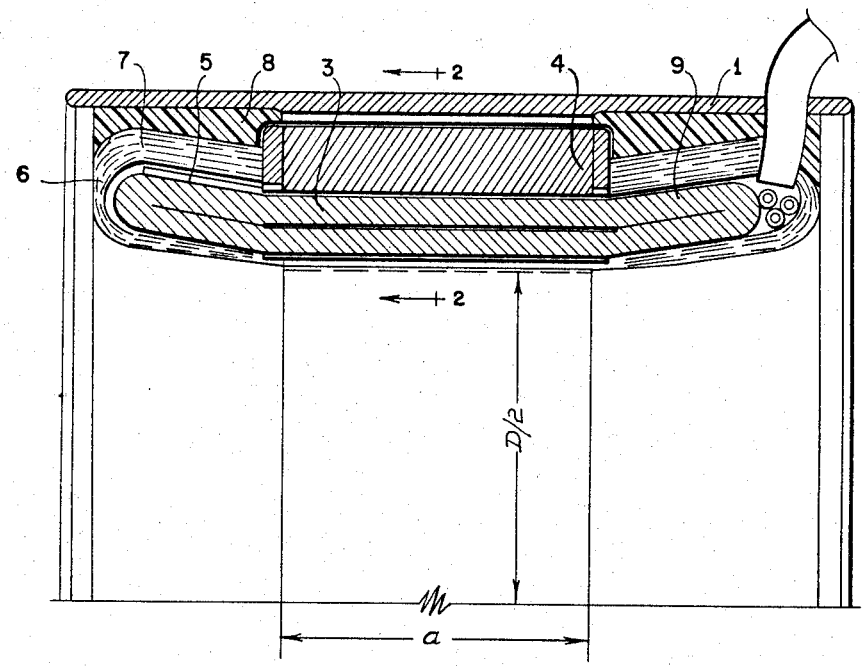
INVENTORS
REINHOLD P. KUSKA
DIONIZY SIMSON
EUGENIUSZ E. MAKOWSKI
BY *Larson and Taylor*
ATTORNEYS 3,374,534
METHOD OF MAKING STATOR WINDINGS OF ELECTRIC MOTORS IN VIBRATORY-BATTING DEVICES
Reinhold P. Kuska, Kuznia Raciborska, and Dionizy Simson and Eugeniusz Makowski, Solec Kujawski, Poland, assignors to Zaklady Sprzetu Budowlanego Nr 2, an enterprise of the Polish State
Filed Oct. 23, 1963, Ser. No. 318,248
2 Claims. (Cl. 29—605)

This invention is concerned with making windings of stators of electric motors for vibrating and vibrating-percussive equipment. More particularly, the invention is concerned with the assembling of a stator to provide it with considerable resistance to mechanical shock and vibration while retaining its required dielectric properties. In general the assembly is accomplished by placing the stack of stator core-plates, complete with its winding, into a thin-walled sleeve of metal or the like, impregnation of these elements with a resin, stiffening of the winding by wrapping, and then bonding the wrapped winding to the thin-walled sleeve with a filling of resin. The resultant assembly is one solid body comprised of winding, core-plates, wrappings, and various portions of resin.

Heretofore, the most modern methods used for impregnating and fastening of electric motor windings in a shell, or those of electro-magnets, have aimed at removing air and gas bubbles from the space between the individual turns and the motor casing when it is filled with various kinds of pure synthetic resins, or with filling agents introduced at pressure or vacuum. All of these methods are satisfactory, as regards dielectric properties and moisture resistance and, for relatively stable elements not subjected to any vibrations e.g. power and measuring transformers, capacitors, emmersion motors etc. Such manufactured motors, however, are not suitable to be applied for vibrating or vibrating-percussive equipment.

There are already some methods for filling of windings of electric motors or electro-magnets intended exclusively for vibrating equipment, e.g. Czechoslovak Patent No. 94,250. This patent shows the insulating of wires from the core by means of a thin glass-cloth and filling of the winding, and the space between them, with synthetic resins. Such windings, however, are intended for concrete compactors, vibratory transport equipment, sorting machines and other vibrating equipment but not for vibrating-percussive equipment. Insulating by application of glass-cloth, as well as filling the winding with resin, when the core and casing are cold, impairs the resin adherence to iron.

It is, therefore, one object of this invention to provide a process whereby an extremely vibration and shock-resistant stator assembly can be produced.

A further object of the invention is to provide an improved stator assembly.

The features of the invention which are believed to be novel are set out with particularity in the appended claims. The invention itself, however, as to its organization together with further objects and advantages thereof, may best be understood by reference to the following description taken in connection with the accompanying drawing.

The motor provided with a winding made according to this invention is shown diagrammatically in the drawing, where the stator vertical longitudinal section, made along one slot in the core-plate stack, is shown in the figure. The winding of only one coil is shown for purposes of illustration and to avoid undue confusion of the drawing.

The faults and inconveniences mentioned above with regard to the prior art are eliminated due to this invention. The application of known polyester epoxy and silicone resins for impregnating and/or filling of the windings, and the utilization of a thin-walled metal sleeve, wherein the stator core-plates stackings with non-insulated slots and wires are placed, taken in conjunction with a definite sequence of filling stages and selection of best conditions and materials, produces the stators assembly of this invention.

To control the polymerization reaction of the resins various fillers and chemical compounds are added. As fillers, glass-cloth, fibre glass and glass powder are utilized: as chemical compounds for control of the polymerization reaction, with their requirement for simultaneous control of the polyester resin viscosity at variable temperatures, some initiators are used e.g. benzoyl peroxide, cyclohexanone hydroxide in the form of HCH 50 paste. Also used, are activating agents such as cobalt naphthenates, which improves the resin viscosity and its adherence to solid bodies, when the resin transition from liquid to solid state of aggregation takes place.

The thin-walled metal sleeve placed in the motor casing, complete with the resin-filled winding, due to its minor mass and a high elasticity, is able to absorb vibrations produced by the vibrating-percussive equipment, and so the resin cracking and delamination, as well as its detaching from the winding and metal parts, is prevented to a considerable extent. The filling with resin of the windings and the stator core-plates with the metal sleeve, is carried out in three stages, and aims at a firm bonding of the resin with the windings and the sleeve metal, and getting these components in one compact, solid body with a considerable mechanical and electric strength.

*Stage I*

In the first stage, the stator core 4 with non-insulated slots 3 and a non-impregnated, non-wedged winding 9 of conventional construction is placed in the thin-walled sleeve 1, and the whole is heated in the furnace at a temperature of about 180° C. for some thirty hours or more. Then, the hot stator is dipped in a tank with liquid polyester resin, which is mixed with an initiator, in amount of some 2% per weight, e.g. the HCH 50 paste, and with an activating agent e.g. the cobalt naphthenate solution, in amount of some 0.2% per weight, and the whole is placed in vacuum-pressure equipment, or in the equipment for centrifugal impregnating of windings in vacuum or without vacuum. Each of two methods possible to be applied in this stage requires more than ten hours processing and aims at getting rid of the air bubbles from the liquid resin 2, impregnation of the windings, and the accurate filling of the slot space. After the windings have been impregnated, the stator is left in a room at a temperature of approx. 20° C. until the resin is hardened. The polymerization process is possible due to the application of the HCH paste, whereas, due to the cobalt naphthenate, the process is accelerated. Simultaneously, the hot polyester resin viscosity becomes lower to enable the resin to thoroughly penetrate into the winding and to facilitate removal of the air bubbles from the space being filled.

Since the polymerization reaction is an exothermic one, the hardening resin temperature is increased. That, in turn, contributes to further acceleration of the polymerization process. Additions of the initiator and the activating agent are rather small in amount and fixed in such a way that the resin hardening process is finished only after the windings are thoroughly impregnated.

*Stage II*

In the second stage, the end windings are to be strengthened on the outer periphery and wrapped together with the glass-cloth 5, which is impregnated at room temperature with the polyester resin with 4% addition of the HCH 50 paste and 0.4% addition of the cobalt naphthenates. While slowly rotating the stator, the empty spaces left between glass-cloth 5 and the end windings 9 should be filled with the same compound as in the first stage, but with addition of the glass powder in amount of about 5% per weight, and subsequently left until the compound hardens. Thereafter, the entire windings are banded with several layers of the glass-cloth 6 with the space 8 between the coils and the sleeve 1 being partially filled with layers 7 of the same glass-cloth impregnated as the glass-cloth 5. The several glass-cloths are shown as one on the drawing, but it will be understood that they are individually applied as hereinabove stated.

Double additions of the HCH 50 paste increased up to 4% and of the cobalt naphthenate up to 0.4%, for the second stage of this method is indispensable because the polymerization process and the connected change of the viscosity take place at room temperature, and therefore more additions are needed to get an appropriate adhesion.

*Stage III*

In the third, and final stage, the space 8, left between the sleeve and the wrapped winding, is filled with the same resin as in the second stage i.e. containing 4% of the HCH paste and 0.4% of the cobalt naphthenate, but with addition of cut glass-cloth in amount of 5% per weight. Filling the space 8 with the cut glass-cloth and the resin, due to the glass-cloth structure, results in a laminate firmly binding the end windings with the sleeve and resistant to the vibrations produced by the vibrating-percussive equipment. The cooling and the polymerization process should be carried out slowly and at a temperature of approx. 20° C. Thereafter the sleeve, complete, with the winding, is placed in the motor casing.

Due to the application of the metal sleeve, the intensive heating and banding the coils, filling the compound with cut fibre and the glass powder, and the operations carried out in the stages—this method tends to produce a strong integral structure. The dielectric and mechanical achieved in this way lead to the motor life extension under vibration and shock environments.

Since certain changes may be made in the above invention and different embodiments of the invention could be made without departing from the scope thereof, it is intended that all matter contained in the above description shall be interpreted as illustrative and not in a limiting sense.

We claim:
1. A method for manufacturing a stator assembly for vibrating and vibrating-percussive equipment having a stator core and associated winding wires, a portion of said wires extending axially from said core, said method comprising the steps of:
    (a) surrounding said stator core and said associated winding wires with a metal sleeve, said portion of said winding wires being spaced from the inner surface of said sleeve,
    (b) heating the whole assembly to a uniform temperature,
    (c) impregnating the whole heated assembly with a first liquid comprised of a mixture of a resin, an initiator, and an activating agent,
    (d) cooling said impregnated assembly to harden said first liquid,
    (e) binding the outside periphery of said portion of said winding wires with glass cloth impregnated with a second liquid comprised of a mixture of a resin, an initiator, and an activating agent,
    (f) filling the spaces between said binding and said winding wires with said first liquid and an addition of a filler,
    (g) allowing the whole assembly to harden,
    (h) covering the windings with glass cloth impregnated with said second liquid, and
    (i) filling the remainder of said space between the covered outside of said portion of said winding wire and said inner surface of said sleeve, with said second liquid and an addition of a filler.

2. A method according to claim 1, wherein said step of heating is further characterized in that it is continued for at least thirty hours at a temperature of about 180° C., said first liquid is further characterized in that its mixture has about 2% by weight of initiator and about 0.2% by weight of activating agent, and said second liquid is further characterized in that its mixture has about 4% by weight of initiator and about 0.4% by weight of activating agent.

References Cited

UNITED STATES PATENTS

| | | | |
|---|---|---|---|
| 2,611,930 | 9/1952 | Hill | 310—43 X |
| 2,642,920 | 6/1953 | Simon | 310—43 X |
| 2,837,669 | 6/1958 | Fisher | 310—43 X |
| 3,002,261 | 10/1961 | Avila | 310—43 X |

JOHN F. CAMPBELL, *Primary Examiner.*

MILTON O. HIRSHFIELD, *Examiner.*

J. W. GIBBS, C. E. HALL, *Assistant Examiners.*